US009108839B2

(12) United States Patent
Dijkema et al.

(10) Patent No.: US 9,108,839 B2
(45) Date of Patent: Aug. 18, 2015

(54) NONWOVENS, TUFTED NONWOVENS, AND ARTICLES CONTAINING THE SAME

(75) Inventors: Jan Dijkema, Zutphen (NL); Edze Jan Visscher, Utrecht (NL)

(73) Assignee: BONAR B.V., Arnhem (NL)

( * ) Notice: Subject to any disclaimer, the term of this patent is extended or adjusted under 35 U.S.C. 154(b) by 1101 days.

(21) Appl. No.: 12/226,562

(22) PCT Filed: May 2, 2007

(86) PCT No.: PCT/EP2007/003843
§ 371 (c)(1),
(2), (4) Date: Dec. 8, 2008

(87) PCT Pub. No.: WO2007/128466
PCT Pub. Date: Nov. 15, 2007

(65) Prior Publication Data
US 2009/0152191 A1 Jun. 18, 2009

(30) Foreign Application Priority Data

May 10, 2006 (DE) .................. 20 2006 007 567 U

(51) Int. Cl.
| | |
|---|---|
| *D04H 13/00* | (2006.01) |
| *D05C 17/00* | (2006.01) |
| *B01D 39/20* | (2006.01) |
| *B68G 11/02* | (2006.01) |
| *B01D 39/16* | (2006.01) |
| *B43K 8/04* | (2006.01) |
| *D04H 1/54* | (2012.01) |
| *D04H 1/542* | (2012.01) |
| *D04H 1/544* | (2012.01) |
| *D04H 1/549* | (2012.01) |
| *D04H 1/55* | (2012.01) |
| *D04H 1/62* | (2006.01) |
| *D04H 1/72* | (2012.01) |
| *D04H 3/12* | (2006.01) |
| *D04H 3/14* | (2012.01) |
| *D06N 7/00* | (2006.01) |
| *D05C 17/02* | (2006.01) |

(52) U.S. Cl.
CPC .............. *B68G 11/02* (2013.01); *B01D 39/163* (2013.01); *B01D 39/1615* (2013.01); *B43K 8/04* (2013.01); *D04H 1/54* (2013.01); *D04H 1/542* (2013.01); *D04H 1/544* (2013.01); *D04H 1/549* (2013.01); *D04H 1/55* (2013.01); *D04H 1/62* (2013.01); *D04H 1/72* (2013.01); *D04H 3/12* (2013.01); *D04H 3/14* (2013.01); *D06N 7/006* (2013.01); *B01D 2239/064* (2013.01); *B01D 2239/0668* (2013.01); *D05C 17/02* (2013.01); *Y10T 428/23979* (2015.04); *Y10T 442/697* (2015.04)

(58) Field of Classification Search
CPC ................. B01D 2239/064; B01D 2239/0668; B01D 39/1615; B01D 39/163; B43K 8/04; B68G 11/02; D04H 1/54; D04H 1/542; D04H 1/544; D04H 1/549; D04H 1/55; D04H 1/62; D04H 1/72; D04H 3/12; D04H 3/14; D05C 17/02; D06N 7/006
USPC .......................................................... 442/415
See application file for complete search history.

(56) References Cited

U.S. PATENT DOCUMENTS

| | | | |
|---|---|---|---|
| 4,210,690 A | 7/1980 | Hartmann et al. | |
| 5,660,910 A | 8/1997 | Hoyt et al. | |
| 5,851,355 A | 12/1998 | Goettmann | |
| 6,103,181 A | 8/2000 | Berger | |
| 6,207,599 B1 * | 3/2001 | Coolen et al. ................ | 442/242 |
| 6,330,883 B1 | 12/2001 | Berger | |
| 6,576,034 B2 | 6/2003 | Berger | |
| 6,582,639 B2 | 6/2003 | Nellis | |
| 6,596,049 B1 | 7/2003 | Berger | |
| 6,602,311 B2 | 8/2003 | Berger | |
| 6,616,723 B2 | 9/2003 | Berger | |
| 6,833,104 B2 | 12/2004 | Berger | |
| 7,179,412 B1 | 2/2007 | Wilkie et al. | |
| 7,192,550 B2 | 3/2007 | Berger et al. | |
| 7,695,794 B2 | 4/2010 | Oosterbroek et al. | |
| 2002/0116910 A1 | 8/2002 | Berger | |
| 2002/0134063 A1 | 9/2002 | Berger | |
| 2002/0139099 A1 | 10/2002 | Berger | |

(Continued)

FOREIGN PATENT DOCUMENTS

| | | |
|---|---|---|
| DE | 36 42 089 A1 | 6/1988 |
| JP | A-11-309063 | 11/1999 |
| WO | WO 00/12800 A2 | 3/2000 |
| WO | WO 03/069039 A1 | 8/2003 |
| WO | WO 2006/079511 A1 | 8/2006 |

OTHER PUBLICATIONS

Dr. R. Krčma, Chapter 10.1 of the "Manual of Nonwovens" (1971), Textile Trade Press, Manchester, England, pp. 202-231.
Oct. 15, 2009 Office Action issued in U.S. Appl. No. 11/794,128.
Jul. 6, 2006 International Search Report issued in International Application No. PCT/EP2006/000629.
Oct. 19, 2007 International Search Report issued in International Application No. PCT/EP2007/006092.

*Primary Examiner* — Dirk Bass
(74) *Attorney, Agent, or Firm* — Oliff PLC

(57) ABSTRACT

A nonwoven is described comprising thermoplastic fibers with a fusion temperature $T_m(\text{th})$, bonding fibers 1 with a fusion temperature $T_m(1)$, and bonding fibers 2 with a fusion temperature $T_m(2)$, whereby for $T_m(\text{th})$, $T_m(1)$, and $T_m(2)$ the condition $T_m(\text{th}) > T_m(1) > T_m(2)$ applies, and whereby the nonwoven contains the bonding fibers in the form of a solidified melt. Furthermore, a tufted nonwoven of the aforementioned type is described that contains tuft fibers. Finally, articles are described that contain the nonwoven or the tufted nonwoven.

15 Claims, No Drawings

(56) References Cited

U.S. PATENT DOCUMENTS

| | | | |
|---|---|---|---|
| 2002/0144490 A1* | 10/2002 | Berger | 55/528 |
| 2003/0196421 A1 | 10/2003 | Berger | |
| 2005/0142325 A1 | 6/2005 | Veurink et al. | |
| 2005/0159064 A1 | 7/2005 | Rowell et al. | |
| 2005/0186290 A1 | 8/2005 | Cals-Grierson | |
| 2008/0116129 A1* | 5/2008 | Oosterbroek et al. | 210/500.1 |
| 2009/0152191 A1 | 6/2009 | Dijkema et al. | |
| 2009/0304953 A1 | 12/2009 | Dijkema et al. | |

* cited by examiner

NONWOVENS, TUFTED NONWOVENS, AND ARTICLES CONTAINING THE SAME

The present invention relates to a nonwoven, a tufted nonwoven, and articles containing the same.

WO 00/12800 discloses a nonwoven primary carpet backing comprising thermoplastic polymer filaments or fibers bonded by means of a binder polymer, whereby the carpet backing comprises at least a distinguishable thermoplastic woven layer, a distinguishable thermoplastic continuous layer, or a distinguishable nonwoven layer likewise comprising filaments or fibers bonded by means of a binder polymer. If this primary carpet backing is tufted, increased stitch holding is observed, although this is associated with reduced delamination strength.

The object of the present invention is therefore to provide a nonwoven that, after tufting, results in a tufted nonwoven with greater stitch holding, but without reduced delamination strength.

This object is achieved, on the one hand, by a nonwoven comprising thermoplastic fibers with a fusion temperature $T_m(th)$, bonding fibers 1 with a fusion temperature $T_m(1)$, and bonding fibers 2 with a fusion temperature $T_m(2)$, whereby for $T_m(th)$, $T_m(1)$, and $T_m(2)$ the condition $T_m(th) > T_m(1) > T_m(2)$ applies, and whereby the nonwoven contains the bonding fibers as a solidified melt.

The nonwoven of the invention maintains its structural integrity to a high degree because the solidified melt of the bonding fibers bonds the thermoplastic fibers, thereby stabilizing the structure of the nonwoven. Furthermore, the nonwoven of the invention has no delamination problems because the nonwoven of the invention is not a laminate.

In the context of the present invention, the term "nonwoven" has the definition known to one skilled in the art. Exemplary are the spun-fiber nonwovens and spunbonded fabrics made of filaments described in Joachim Lünenschloβ and Wilhelm Albrecht's "Vliesstoffe" ["Nonwovens"], Georg Thieme Verlag Stuttgart New York (1982), Chapter 2.1.1.1-2.

In the context of the present invention, the term "thermoplastic fibers" is to be understood in its broadest sense, and as such it includes thermoplastic mono- and multifilaments or staple fibers, provided that their fusion temperature $T_m(th)$ meets the condition $T_m(th) > T_m(1) > T_m(2)$. It goes without saying that the thermoplastic fibers need to meet those specifications, in terms of strength, elongation at rupture, modulus, formability, dimensional stability, and so on, that are required to produce a nonwoven thereof. Furthermore, the thermoplastic fibers used in accordance with the invention can contain spinning agents, fillers, flame retardants, UV inhibitors, crystallizing agents, plasticizers, accelerants/retardants, thermal stabilizers, antimicrobial additives or combinations of the cited substances in such amounts that the aforementioned specifications for the thermoplastic fibers are still met.

In a preferred embodiment, the nonwoven of the invention comprises thermoplastic fibers that comprise a thermoplastic polymer that is selected from the group consisting of polyethylene terephthalate, polypropylene, polyamide, polybutylene terephthalate, polytrimethylene terephthalate, polyphenylene sulfide, polyethylene naphthalate, polyethylene imide, polylactic acid, and polyoxymethylene.

In the context of the present invention, the term "bonding fibers" is defined as fibers that—worked into the nonwoven of the invention—are in a position to form a solidified melt that bonds the thermoplastic fibers of the nonwoven of the invention, thereby stabilizing the structure of the nonwoven. Therefore, in the context of the present invention, any type of fiber that fulfills the aforementioned condition can serve as a bonding fiber, whereby the bonding fibers 1 with a higher fusion temperature have a fusion temperature lower than the fusion temperature of the thermoplastic fibers. Such fibers can be selected from a large variety of classes of substances, provided that they fulfill the aforementioned conditions. The bonding fibers are usually synthetic fibers that comprise organic polymers, such as thermoplastics, elastomers, or thermoplastic elastomers. The bonding fibers can be biodegradable.

In a preferred embodiment, the nonwoven of the invention comprises bonding fibers 1 that comprise a thermoplastic polymer selected from the group consisting of polyamide, polypropylene, polyethylene or copolymers thereof, polybutylene terephthalate, polylactic acid, aliphatic polyesters, copolyamides, and copolyesters.

In another preferred embodiment, the nonwoven of the invention comprises bonding fibers 2 that comprise a thermoplastic polymer selected from the group consisting of polypropylene, polyethylene or copolymers thereof, polylactic acid, polyvinyl chloride, copolyamides, and copolyesters.

In the context of the present invention, the term "solidified melt" means that the nonwoven of the invention contains bonding fibers 1 and 2 in a solidified form, that is obtained by heating the random laid layer comprising the thermoplastic fibers, bonding fibers 1, and binding fibers 2 to a temperature for manufacturing nonwovens $T_v$ that fulfills the condition $T_m(th) > T_v > T_m(1)$, after which the above-mentioned random laid layer is cooled to a temperature at which the polymer that forms bonding fibers 2 is also solidified.

In another preferred embodiment of the nonwoven of the invention, the fusion temperature of bonding fibers 1, $T_m(1)$, is at least 5° C., more preferably at least 10° C., and, in particular, preferably at least 20° C., higher than the fusion temperature of bonding fibers 2, $T_m(2)$.

For the nonwoven of the invention, the fusion temperature of the thermoplastic fibers, $T_m(th)$, is furthermore preferably at least 20° C. higher than the fusion temperature of bonding fibers 1, $T_m(1)$.

In a preferred embodiment of the nonwoven of the invention, the thermoplastic fibers comprise polyethylene terephthalate with a fusion temperature $T_m(th)=250°$ C. and the bonding fibers 1 comprise polyamide 6 with a fusion temperature $T_m(1)=220°$ C.

In a particularly preferred embodiment of the nonwoven of the invention, the thermoplastic fibers comprise polyethylene terephthalate with a fusion temperature $T_m(th)=250°$ C., the bonding fibers 1 comprise polyamide 6 with a fusion temperature $T_m(1)=220°$ C., and the bonding fibers 2 comprise polypropylene with a fusion temperature $T_m(2)=160°$ C.

In the nonwoven of the invention, the weight ratio of the thermoplastic fibers w(th), bonding fibers 1 w(1), and bonding fibers 2 w(2) can be set within a broad range, whereby percentages of bonding fibers 1 and 2 are selected higher, the greater the demands are on the structural integrity of the nonwoven, under the intended application conditions. Preferably the ratio of w(th):w(1):w(2) is in a range of 90:5:5 to 40:30:30 percent by weight, particularly preferably in a range of 80:10:10 to 60:20:20 percent by weight.

To produce the nonwoven of the invention, the thermoplastic fibers, bonding fibers 1, and bonding fibers 2 are mixed using one of the methods known to one skilled in the art, creating a random laid layer, whereby the selected mixing method is able to guarantee sufficiently homogeneous mixing of the thermoplastic fibers and bonding fibers 1 and 2 in the random laid layer. The term "homogeneous mixture" means here that in each volume element of the random laid layer the ratio w(th):w(1):w(2) is about the same. The mixing method preferably consists of assembling or mixing at a spool creel or spinning from a 3-component spin pack.

To prepare the random laid layer any method known for this purpose can be employed, for example, the methods that are described in Chapter 10.1 of the "Manual of Nonwovens" (1971), Textile Trade Press, Manchester, England, in association with W.R.C. Publishing Co., Atlanta, United States.

The random laid layer is heated to a temperature for manufacturing nonwovens $T_v$ that conforms to the condition $T_m(th) > T_v > T_m(1)$, after which the random laid layer is cooled to a temperature at which the polymer forming the bonding fibers 2 also solidifies, resulting in the nonwoven of the invention. The time during which $T_v$ acts on the random laid layer is selected in such a way that sufficient amounts of bonding fibers 1 and 2 can melt that after cooling a solidified melt results that bonds the thermoplastic fibers.

The underlying object of the present invention is furthermore achieved by a tufted nonwoven comprising thermoplastic fibers with a fusion temperature $T_m(th)$, bonding fibers 1 with a fusion temperature $T_m(1)$ and bonding fibers 2 with a fusion temperature $T_m(2)$, whereby for $T_m(th)$, $T_m(1)$, and $T_m(2)$ the condition $T_m(th) > T_m(1) > T_m(2)$ applies, whereby the nonwoven contains the bonding fibers as a solidified melt, whereby the tufted nonwoven contains tuft fibers that are bonded by means of a solidified melt of bonding fibers 2 to the thermoplastic fibers, if necessary.

For the terms "nonwoven," "thermoplastic fibers," "bonding fibers 1 and 2," "solidified melt," and for their preferred embodiments the definitions provided in the description of the nonwoven of the invention apply analogously.

The term "tuft fibers" generally comprises, in the context of the present invention, all fibers that can be employed as tuft fibers provided that the fusion or decomposition temperature of these fibers is higher than the temperature $T_t$ defined in the following paragraph.

To produce the tufted nonwoven of the invention, the nonwoven of the invention is tufted using a method known to one skilled in the art. Then the tufted nonwoven can be heated to a temperature $T_t$ that fulfills the condition $T_m(1) > T_t > T_m(2)$, which causes the material forming the bonding fibers 2 to fuse. After cooling to a temperature at which the polymer forming the bonding fibers 2 solidifies, a solidified melt of bonding fibers 2 results, which bonds the tuft fibers to the thermoplastic fibers.

In a preferred embodiment of the tufted nonwoven of the invention, the tuft fibers comprise a material that is selected from the group consisting of polyamide, polypropylene, polylactic acid, wool, and cotton.

The tufted nonwoven of the invention exhibits excellent stitch holding. This is particularly true if the tuft fibers are bonded to the thermoplastic fibers by means of a solidified melt of bonding fibers 2.

The high dimensional stability and structural integrity of the nonwoven of the invention are advantageously apparent in a multitude of articles that contain the nonwoven of the invention and for which the cited properties are important.

This includes filters for industrial and medical applications that contain the nonwoven of the invention. Such filters likewise form a part of the present invention and can be designed for industrial applications, for example, as dust, soot, pollen, or gas filters, or for medical applications, for example, as bacterial or viral filters, or as filters for exchanging heat and moisture. In the last-mentioned embodiment, the filter of the invention absorbs heat and moisture from the air a patient exhales. For this embodiment of the filter of the invention, suitable thermoplastic fibers and bonding fibers are those that have low heat conductivity and high hydrophilic properties, such as polyamide fibers.

Furthermore, coalescence filters for separating a hydrophilic fluid from a hydrophobic fluid, wherein the coalescence filters contain a nonwoven of the invention, also form part of the present invention. A filter of this type can remove, for example, water from aviation gasoline. This is more successful the more hydrophilic the thermoplastic fibers and the bonding fibers of the nonwoven are because as the hydrophilicity increases, the water-binding ability of the fibers increases.

Furthermore, a wick comprising a nonwoven of the invention and used as a repository for ink during the transfer of ink in marking and writing utensils, for medical applications or for other products that hold and transport fluids forms part of the present invention. Thermoplastic fibers and bonding fibers with a high surface energy are particularly well-suited to act as wicks since said energy enables the fibers to absorb the desired volume of fluid. For this embodiment, thermoplastic fibers and bonding fibers made of polyethylene terephthalate are thus more suitable than those made from, for example, polyolefins.

The high dimensional stability, structural integrity, and stitch holding of the tufted nonwoven of the invention are advantageously apparent in a multitude of articles that contain the tufted nonwoven of the invention and for which the cited combination of properties is important.

This includes a tufted carpet for home textiles, pillows, cushions, textiles in automobiles, trains or airplanes, and exterior applications such as artificial turf or playing surfaces whereby the tufted carpet comprises a tufted nonwoven of the invention. A carpet of this type likewise forms part of the present invention.

Lastly, a molded carpet containing a tufted nonwoven of the invention forms part of the present invention.

The invention claimed is:

1. Nonwoven comprising three separate and distinct fibers: thermoplastic fibers with a fusion temperature $T_m(th)$, bonding fibers 1 with a fusion temperature $T_m(1)$, and bonding fibers 2 with a fusion temperature $T_m(2)$, wherein
for $T_m(th)$, $T_m(1)$, and $T_m(2)$ a condition $T_m(th) > T_m(1) > T_m(2)$ applies;
the nonwoven contains the bonding fibers as a solidified melt;
the thermoplastic fibers, the bonding fibers 1, and the bonding fibers 2 are mixed to create a random laid layer;
in each volume element of the random laid layer, a ratio of a weight of the thermoplastic fibers w(th) to a weight of the bonding fibers 1 w(1) to a weight of the bonding fibers 2 w(2), is about the same; and
the thermoplastic fibers are monofilaments, multifilaments, or mixtures thereof.

2. Nonwoven according to claim 1, wherein the thermoplastic fibers comprise a thermoplastic polymer that is selected from the group consisting of polyethylene terephthalate, polypropylene, polyamide, polybutylene terephthalate, polytrimethylene terephthalate, polyphenylene sulfide, polyethylene naphthalate, polyethylene imide, polylactic acid, and polyoxymethylene.

3. Nonwoven according to claim 1, wherein the bonding fibers 1 comprise a thermoplastic polymer selected from the group consisting of polyamide, polypropylene, polyethylene or copolymers thereof, polybutylene terephthalate, polylactic acid, aliphatic polyesters, copolyamides, and copolyesters.

4. Nonwoven according to claim 1, wherein the bonding fibers 2 comprise a thermoplastic polymer selected from the group consisting of polypropylene, polyethylene or copolymers thereof, polylactic acid, polyvinyl chloride, copolyamides, and copolyesters.

5. Nonwoven according to claim 1, wherein the fusion temperature of the bonding fibers 1 $T_m(1)$ is at least 5° C. higher than the fusion temperature of the bonding fibers 2 $T_m(2)$.

6. Nonwoven according to claim 1, wherein the fusion temperature of the thermoplastic fibers $T_m(th)$ is at least 20° C. higher than the fusion temperature of the bonding fibers 1 $T_m(1)$.

7. Nonwoven according to claim 1, wherein the thermoplastic fibers comprise polyethylene terephthalate with a fusion temperature of $T_m(th)=250°$ C., and the bonding fibers 1 comprise polyamide 6 with a fusion temperature $T_m(1)=220°$ C.

8. Nonwoven according to claim 7, wherein the thermoplastic fibers comprise polyethylene terephthalate with a fusion temperature of $T_m(th)=250°$ C., the bonding fibers 1 comprise polyamide 6 with a fusion temperature $T_m(1)=220°$ C., and the bonding fibers 2 comprise polypropylene with a fusion temperature $T_m(2)=160°$ C.

9. Tufted nonwoven comprising three separate and distinct fibers: thermoplastic fibers with a fusion temperature $T_m(th)$, bonding fibers 1 with a fusion temperature $T_m(1)$, and bonding fibers 2 with a fusion temperature $T_m(2)$, wherein
for $T_m(th)$, $T_m(1)$, and $T_m(2)$ a condition $T_m(th) > T_m(1) > T_m(2)$ applies;
the tufted nonwoven contains tuft fibers that are bonded by means of a solidified melt of bonding fibers 2 to the thermoplastic fibers;
the thermoplastic fibers, the bonding fibers 1, and the bonding fibers 2 are mixed to create a random laid layer; and
in each volume element of the random laid layer, a ratio of a weight of the thermoplastic fibers w(th) to a weight of the bonding fibers 1 w(1) to a weight of the bonding fibers 2 w(2), is about the same.

10. Tufted nonwoven according to claim 9, wherein the tuft fibers comprise a material that is selected from the group consisting of polyamide, polypropylene, polylactic acid, wool, and cotton.

11. Filter for industrial or medical applications containing a nonwoven according to claim 1.

12. Coalescence filter for separating a hydrophilic fluid from a hydrophobic fluid containing a nonwoven according to claim 1.

13. Wick used as a repository for the transfer of ink in marking and writing utensils, for medical applications, or for other products that hold and convey fluids, whereby the wick comprises a nonwoven according to claim 1.

14. Tufted carpet for home textiles, pillows, cushions, textiles in automobiles, trains or airplanes, and artificial turf or playing surfaces whereby the tufted carpet comprises a tufted nonwoven according to claim 9.

15. Molded carpet containing a tufted nonwoven according to claim 9.

* * * * *